Nov. 9, 1926.

J. T. ANDERSON

INNER TUBE

Filed Dec. 21, 1925 2 Sheets-Sheet 1

1,606,682

James T. Anderson,
INVENTOR

BY Victor J. Evans
ATTORNEY

WITNESS:

Nov. 9, 1926.　　　　　　　　　　　　　　　　　1,606,682
J. T. ANDERSON
INNER TUBE
Filed Dec. 21, 1925　　　2 Sheets-Sheet 2

James T. Anderson,
INVENTOR
BY Victor J. Evans
ATTORNEY

Patented Nov. 9, 1926.

1,606,682

UNITED STATES PATENT OFFICE.

JAMES T. ANDERSON, OF LAWRENCE, MASSACHUSETTS.

INNER TUBE.

Application filed December 21, 1925. Serial No. 76,863.

This invention relates to improvements in inner tubes, the general object being the provision of a plurality of interencircling compression springs arranged within a tire for taking up the space generally provided for the inner tube in order that a spring cushion may be thus provided therefor, and an assurance that no punctures will occur owing to any deflation.

Another object of my invention resides in the construction of the inner tube per se providing interassociated hingedly connected plates positioned within the tire or shoe and having flange members associated with the corresponding edges of the plates so that the spring compression of the tire will be restricted and ample and sufficient space allowed for any sidewise movement of the tire to provide easy riding and especially in cutting corners in a street or bends in roadways.

A further object of my invention resides in the provision of plunger members carried by the plates and fitted within cylinders having springs mounted thereon for resiliently guiding and holding the plates in an upright position with respect to an imaginary center of the tire rim, and it further provides a restriction so as to prevent the plates from becoming accidentally displaced from the adjacent side edges of the flange members.

With the above and other objects in view, the invention further includes the following novel features and details of construction, to be hereinafter more fully described, illustrated in the accompanying drawings and pointed out in the appended claims.

In the drawings:—

Figure 1:
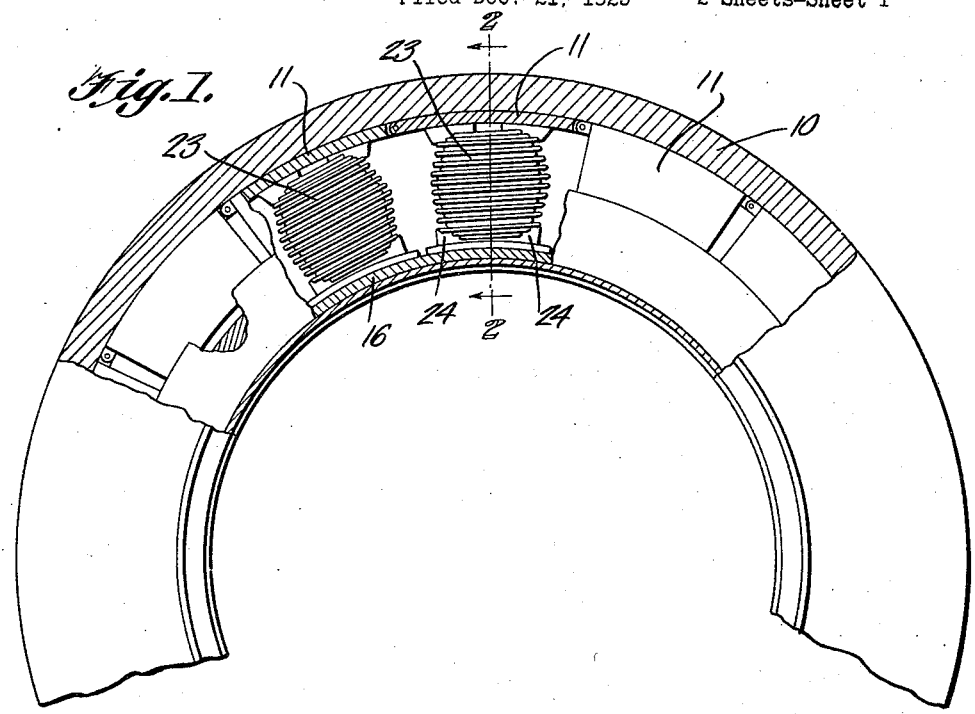
Figure 1 is an elevation of a portion of an automobile tire showing my present invention applied and illustrated with parts broken away and in section.
Figure 3:
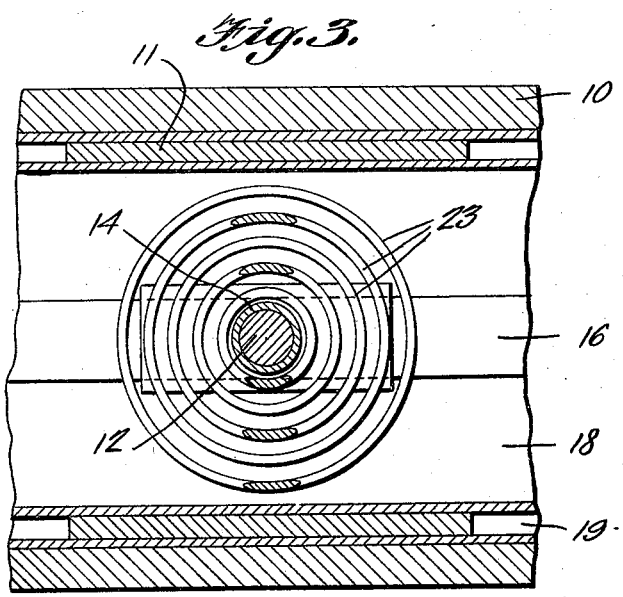
Figure 3 is a fragmentary transverse section taken on the line 3—3 of Figure 2.
Figure 2:
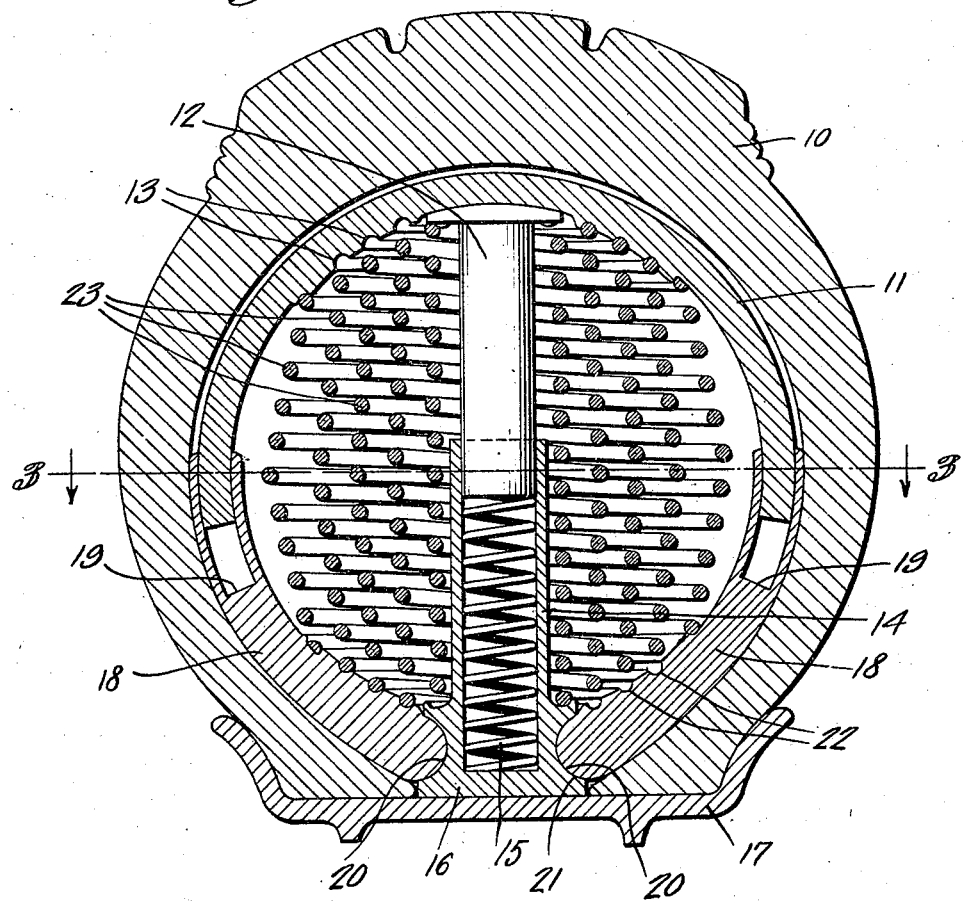
Figure 2 is a vertical sectional view taken on the line 2—2 of Figure 1.

Referring to the drawings, in detail wherein like characters of reference denote corresponding parts, the reference character 10 indicates an automobile tire or shoe, which is of the usual and well known construction and formation and forms no part of the present application for Letters Patent, but is merely shown for purposes of illustration in bringing forward the novel advantages of the above entitled invention.

The invention residing in the provision of a plurality of plates 11 semi-circular in cross-section having their tread contacting and adjacent end portions hingedly associated and providing ample and sufficient space between their inner edges and forming a continuous chain of plates within the tire and contiguous to the tread wall thereof. and conforming exactly to the inner side of the tire when so arranged. The plates 11 have plungers 12 extending centrally upon their inner sides and encircled by a plurality of grooves 13 upon the plates, the purpose of which will be presently apparent. Receiving the inner free ends of the plungers 12 are cylinders 14 having compression springs 15 arranged therein for engaging the inner free ends of the inserted end portions of the plungers 12. The opposite ends of the cylinders are formed upon the outer sides of circumferential band 16.

In order to provide means for completing the remaining portion of a circular member corresponding in shape to the cross section of an inner tube, I provide curved annular plates 18 having their outer edges providing bifurcated portions 19 for receiving the adjacent side edges of the plates 11 semi-circular in cross-section, their inner edges being rounded as indicated at 20 for seating and rocking movement within correspondingly shaped grooves 21 provided in the adjacent and opposite sides of the rim or band 16. The interior sides of the curved plates 18 also instance annular grooved portions 22 which encircle the cylinders 14, as in the stance of the grooved portions 13 upon the inner sides of the plates 11 semi-circular of cross-section which encircle the plungers 12, both sets of these grooves being adapted for seating the respective end convolutions of a plurality of interfitting compression springs 23 to provide a spring cushion for the tire, as completed. The band 16 further includes wedge-shaped portions 24 upon its outer side for preventing displacement of the springs 23 when so arranged.

In the use and operation of the present invention, it is clearly apparent and manifest that the inner tube, as completed, when inserted in the manner as described and illustrated in the foregoing description and accompanying drawings will provide a spring cushion for the tire equivalent to that of the pneumatic inner tube, prevent the plates from undue lateral movement within the tire 10 owing to the mounting of the plungers 12 within the cylinders 14 and against the compression springs 15 seated therein, and the spaces thus provided within the bifurcated edge portions 19 of the curved annular plates 18 which are provided for lateral movement of the entire tire when the vehicle to which the tire is affixed makes a turn which usually throws the weight of the car over to one side of the tire.

The invention is susceptible of various changes in its form, proportions and minor details of construction, and the right is herein reserved to make such changes as properly fall within the scope of the appended claims.

Having thus described my invention, what is claimed is:—

1. An inner tube of the character described comprising a plurality of plates semi-circular in cross section having their meeting edges hingedly secured in forming an endless chain, said plates having ample and sufficient space provided between their inner edges and allowing for deflation of the tire, a pair of curved annular plates having bifurcated portions upon their outer edges for telescopically receiving the side edges of the plates semi-circular in cross section therein, a band arranged upon the tire rim, cylinders radiating therefrom, plungers arranged centrally upon the inner sides of the plates semi-circular in cross section and received within the outermost end portions of the cylinders for restricting the lateral movement of the plates semi-circular in cross section and spring means interposed between the first named and last named plates.

2. An inner tube of the character described comprising a plurality of plates semi-circular in cross section having their adjacent meeting edges hingedly associated in forming an endless chain, said plates having ample and sufficient space provided between the inner edges, plungers provided centrally and extending inwardly from the inner sides of the plates semi-circular in cross section, a band provided upon the tire rim, cylinders radiating therefrom, compression springs arranged within the cylinders, a pair of annular plates having bifurcated portions upon their outer edges for telescopically associating the inner edges of the plates semi-circular in cross section, said annular plates having their remaining edges rounded and fitted within correspondingly shaped grooves provided in the adjacent sides of the band, and a plurality of interassociated compression springs having their respective end convolutions bearing against the corresponding inner sides of the first named and last named plates and encircling the plungers and cylinders therefor in providing a spring cushion for the tire and restricting the lateral movement thereof.

In testimony whereof I affix my signature.

JAMES T. ANDERSON.